United States Patent [19]
Olson et al.

[11] Patent Number: 5,118,970
[45] Date of Patent: Jun. 2, 1992

[54] CONTROLLER FOR DISABLING A DATA BUS

[75] Inventors: Bryan K. Olson, Lafayette; Charles L. Still, Louisville, both of Colo.

[73] Assignee: Storage Technology Corporation, Louisville, Colo.

[21] Appl. No.: 564,629

[22] Filed: Dec. 8, 1990

[51] Int. Cl.⁵ .......................................... H03K 17/56
[52] U.S. Cl. .................................. 307/443; 307/242
[58] Field of Search ............. 307/443, 480, 481, 239, 307/241, 242

[56] References Cited

U.S. PATENT DOCUMENTS

| | | | |
|---|---|---|---|
| 3,757,138 | 9/1973 | Bhatia et al. | 307/235 R |
| 3,849,726 | 11/1974 | Justice | 324/73 R |
| 4,196,360 | 4/1980 | Miller et al. | 307/270 |
| 4,438,494 | 3/1984 | Budde et al. | 364/200 |
| 4,870,704 | 9/1989 | Matelan et al. | 364/200 |

OTHER PUBLICATIONS

"Open Line Detection On CPU Channel Bus", Bersac and Calvignac, IBM Technical Disclosure Bulletin, vol. 26, No. 4, Sep. 1983, pp. 2037-2038.

"CMOS Static Memory with a New Four-Transistor Memory Cell", Lyon and Schediwy, 1987 Stanford Conference 111-32, pp. 111-132.

"Testing's Impact On Design & Technology", 1986 IEEE International Test Conf., Sep. 8-11, 1986, paper 4.4, pp. 161-168.

"A Line-Driver And Receiver Circuit With Signal-Level Recognition", Gottlicher and Hauenstein, Elektronik V. 29, N. 17, 21 Aug. 1980, pp. 63-66.

Primary Examiner—David Mis
Attorney, Agent, or Firm—Dorr, Carson, Sloan & Peterson

[57] ABSTRACT

A software controlled system having a signal source connected to logic circuits via data busses. User operated circuitry permits any selected data bus to be temporarily isolated from the signal source so that maintenance and/or logic circuit replacement may be performed on the isolated data bus.

12 Claims, 6 Drawing Sheets

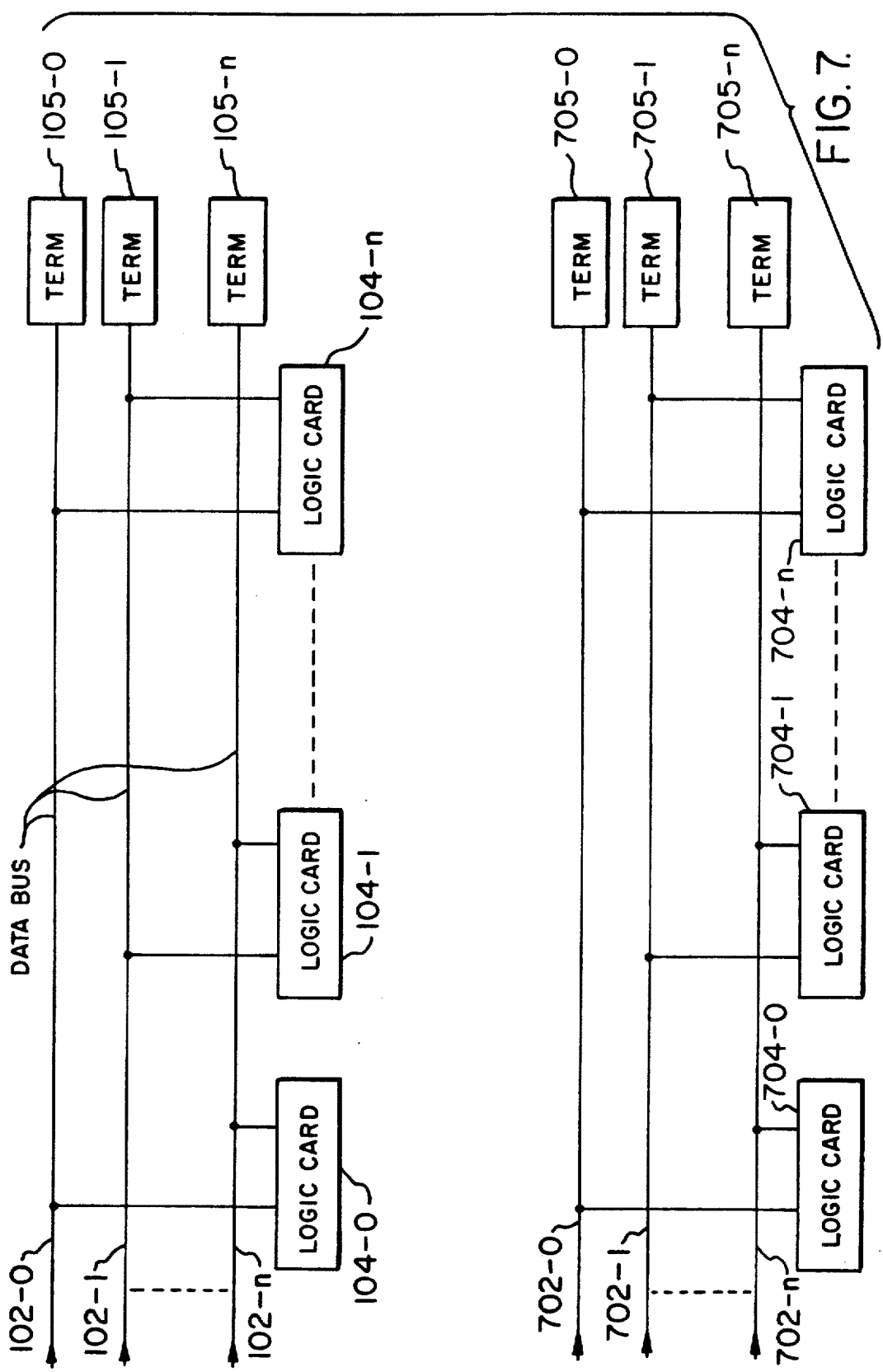

CONTROLLER FOR DISABLING A DATA BUS

FIELD OF THE INVENTION

This invention relates to a system for controlling the operational status of a data bus and, in particular, to a system in which a data bus may be selectively disabled for the performance of system maintenance functions without disabling the entire system of which the bus is a part.

BACKGROUND OF THE INVENTION

It is often a problem in data processing systems to perform maintenance functions without inconveniencing the system users by removing the system from service. For this reason, it is common practice to perform routine maintenance during evening hours when the system is lightly loaded so that a minimum number of users will be inconvenienced. This practice is effective for installations in which maintenance can be scheduled and deferred until the evening hours when the system is less utilized than it is during daytime hours. This practice is not suitable for installations in which the system is heavily utilized 24 hours a day. It is also not suitable for emergencies which may occur at any time and which must be promptly remedied to restore the system to full operating efficiency.

Some maintenance can be performed while a machine remains operational by removing and replacing a non-critical defective element. However, there are certain critical elements which cannot be removed without affecting system operation. When trouble is detected in these critical elements, the entire system must be shut down so that the element can be replaced. This, of course, is undesirable, since it inconveniences the system users and keeps the system out of service until the defects are remedied.

An example of a critical system element is the system data buses and their connected circuits. Typically, each data bus is connected to a plurality of logic circuit cards which receive the signals applied to the bus by a driver circuit. Circuitry on the logic cards responds to the bus data signals and controls the system function for which each logic card is responsible. Defects can occur in these logic cards and normal maintenance procedure is to remove a defective card and replace it with a new one.

Data buses are typically transmission lines having precise impedance matching requirements which must be met so that reflected signals and standing waves do not appear on the busses. These signals could be reflected back to the bus drivers and destroy them as well as other portions of the system to which the drivers are connected. The number of logic cards that are connected to the bus must also be carefully controlled so that the impedance matching requirements of the bus are met. A typical data bus is connected to one or more logic cards and the end of the bus is connected to a termination resistor network which matches the characteristic impedance of the bus to minimize the generation of destructive standing waves. This impedance matching requirement precludes the addition or removal of a logic card to or from a data bus while the data bus remains active. For this reason, it is not an acceptable procedure to remove a defective card from a bus and replace it with a new card without withdrawing the system from service.

It can therefore be seen as is often a problem in data processing systems to perform maintenance functions without first removing the system from service.

SUMMARY OF THE INVENTION

The present invention solves the above-discussed problem and achieves an advance in the art by providing circuitry which effectively divides a bus system into a plurality of discrete segments and which can controllably disable a selected bus segment so that logic cards may be removed from and/or added to the disabled segment without removing the system from service. The disabling of a bus segment precludes the application of any signals to the bus while the bus remains disabled so that the removal and/or replacement of cards does not cause the generation of standing waves.

Each data bus segment is connected to a bus driver circuit which applies data signals and the like to the bus segment for transmission to the logic cards connected to the segment. In accordance with the invention, each bus driver may be selectively disabled or inhibited in response to receipt of a signal received from a system controller. During the time the driver is inhibited, data signals applied to its input do not pass through the driver and do not appear on the data bus segment to which it is connected. At such times, logic cards may be removed from the bus segment connected to the driver without causing destructive standing waves to be generated on the bus.

The system embodying the invention comprises a source bus, a plurality of bus controllers, and a plurality of bus segments connected to each bus controller. Each controller contains a plurality of bus drivers each of which is connected to one of the bus segments connected to its bus controller. Each bus controller is connected at its input to the source bus and during normal system operation, data signals appearing on the source bus are applied to all bus controllers and, in turn, to all bus drivers in each controller. The received data signals are normally extended through each bus driver and over the bus segment connected to each driver to the logic cards connected to the segment. Each of the plurality of bus controllers includes a decoder whose input is connected to a maintenance bus and whose output is connected via separate conductors to an inhibit control input of each driver.

When a system defect is encountered, maintenance personnel identify the nature of the defect and narrow it down to a particular logic card. The maintenance person then generates a command which is entered into a microprocessor driven system controller which identifies the bus controller associated with the defective logic card as well as the particular data bus segment to which the defective logic card is connected. The operating system controller then sends a command over the maintenance bus to the decoder of the bus controller whose driver is connected via a bus segment to the defective card. This command causes the output of the decoder to inhibit the bus driver of the bus segment to which the defective logic card is connected. The inhibited bus driver does not apply data signals to its bus segment as long as it remains inhibited. The defective logic card may then be removed from the disabled bus segment and replaced with a new card. The user then inputs a second command into the operating system controller which sends a coded command over the maintenance bus to the decoder of the bus driver connected to the bus segment to which the replaced logic card is connected. This command removes the inhibiting potential from the driver of the disabled bus segment and restores the segment to normal operation.

The circuitry provided in accordance with the present invention effectively subdivides the data bus of the system into a plurality of controllable segments which may be individually disabled without shutting down the rest of the system so that maintenance operations may be performed on the circuits connected to the disabled data bus segment. The above procedures are effective not only in the removal and replacement of defective logic cards, they are also effective in situations in which the number of circuits connected to a data bus segment is to be changed such as, for example, the addition of more logic cards to the bug segment or the removal of logic cards from the bus segment.

It can therefore be seen that the provision of the present invention facilitates the maintenance of a data processing system by permitting critical maintenance functions to be provided to a portion of a data bus system without removing the entire system from service.

DESCRIPTION OF THE DRAWINGS

The above and other advantages and features of the invention may be better understood from a reading of the following description thereof taken in conjunction with the drawing in which FIG. 1 discloses a system comprising one possible exemplary embodiment of the invention;

FIGS. 6 and 7 disclose further details of the system of FIG. 1;

DETAILED DESCRIPTION

Figure 1:
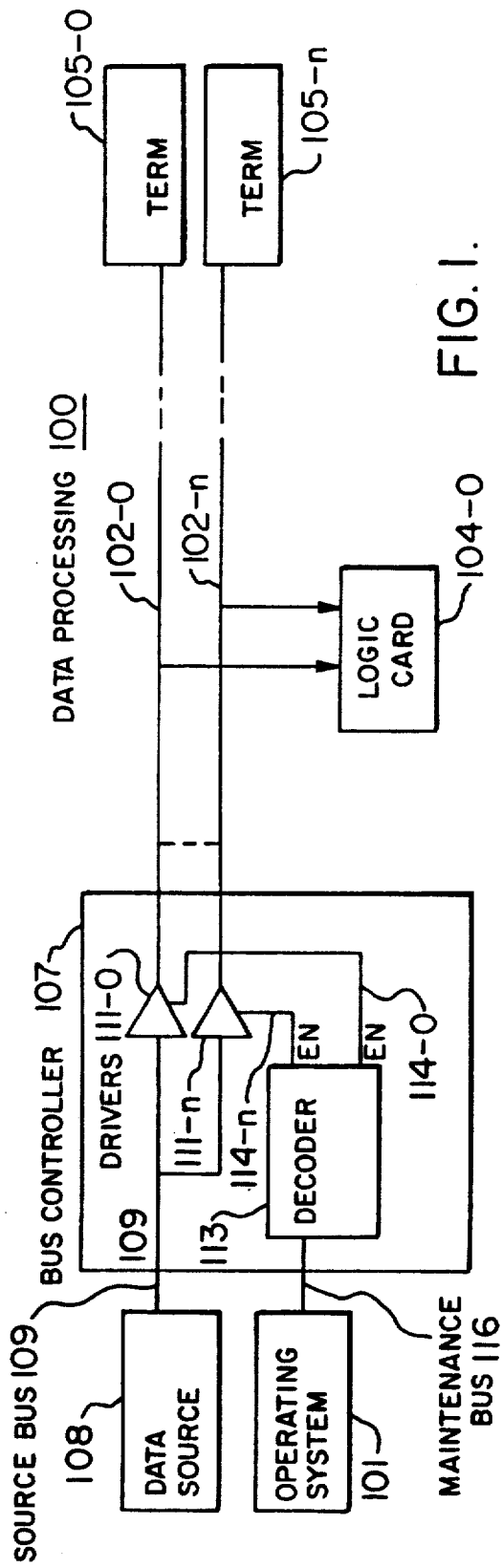

FIGS. 1, 2, 3, and 4 are simplified representations of a system embodying the present invention. FIG. 1 discloses a data processing system 100 having a data source 108 which is connected via source bus 109 and bus controller 107 to a plurality of data bus segments 102-0 through 102-n. Data bus segments 102 are connected to one or more logic cards, such as logic card 104-0, as well as to impedance terminations 105-0 through 105-n. Others of data buses 102-0 through 102-n may be connected to other logic cards 104 and terminations 105 (not shown).

Bus controller 107 functions doing normal system operation to receive data signals and the like from data source 108 and to apply these signals via drivers 111 to data bus segments 102 for the use by logic cards 104. Maintenance bus 116 extends control signals from operating system 101 to decoder 113 within bus controller 107. Decoder 113 has a plurality of output conductors 114-0 through 114-n each of which extends to the control input of a different one of bus drivers 111-0 through 111-n. Decoder 113 normally operates so that the potentials on its output conductors 114 permit drivers 111 to remain enabled so that they can pass the data signals received from data source 108 via source bus 109.

FIG. 1 portrays the normal operating state of the system in which the logic cards 104 connected to the data buses 102 respond to the data signals generated by source 108 and applied via bus controller 107 to data buses 102.

Figure 2:
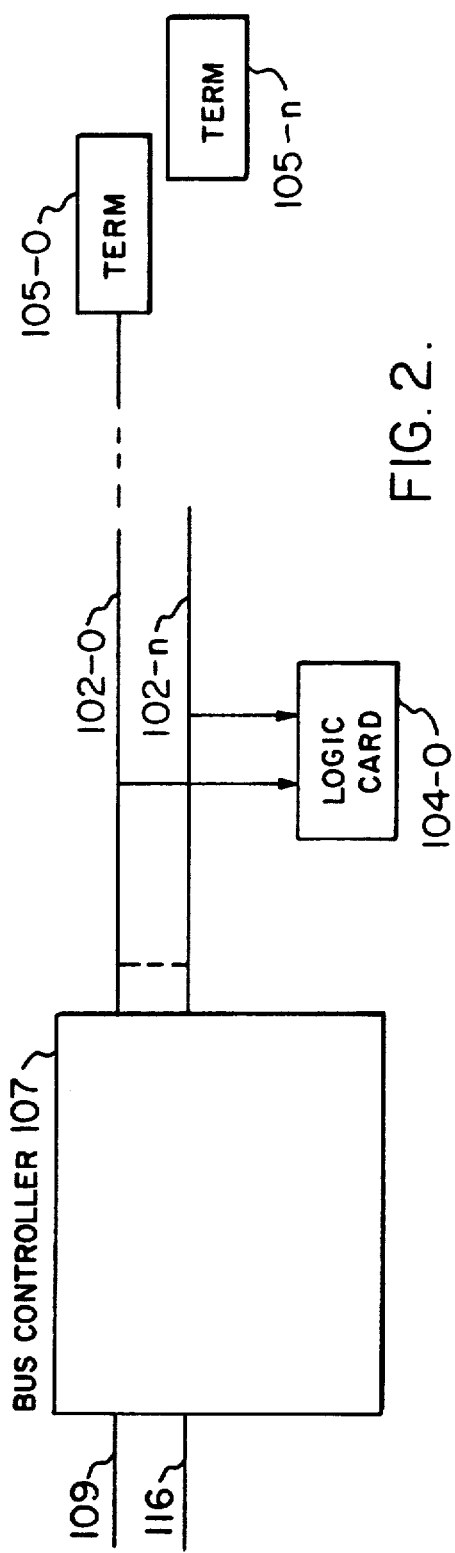
FIG. 2 discloses a system configuration wherein a logic card may be removed from a data bus segment.

FIG. 2 portrays the state of the system in which maintenance or changes is required on the logic card circuitry associated with data bus 102-n. For example, it may be desired to add another logic card 104 to the data bus system 102. In so doing however, it is desired not to shut down the entire system. In accordance with the present invention, this is done by causing operating system 101 to generate a command which is transmitted to decoder 113 to cause conductor 114-n to apply an inhibit potential to the control input of driver 111-n so that it no longer passes the data signals it receives from source bus 109. In this condition, data signals cannot be applied to data bus 102-n and logic cards 104 may be removed from or added to data bus 102-n without causing the generation of standing waves that could destroy driver 111-n. This system state is shown in FIG. 2 wherein the termination 105-n is temporarily disconnected from data bus 102-n preparatory to adding another logic card to data bus 102-n. On FIG. 2 it should be noted that during the period of time that data bus 102-n is inhibited, logic card 104-0 remains operational and performs its system functions by receiving data signals from data bus 102-0.

Figure 3:
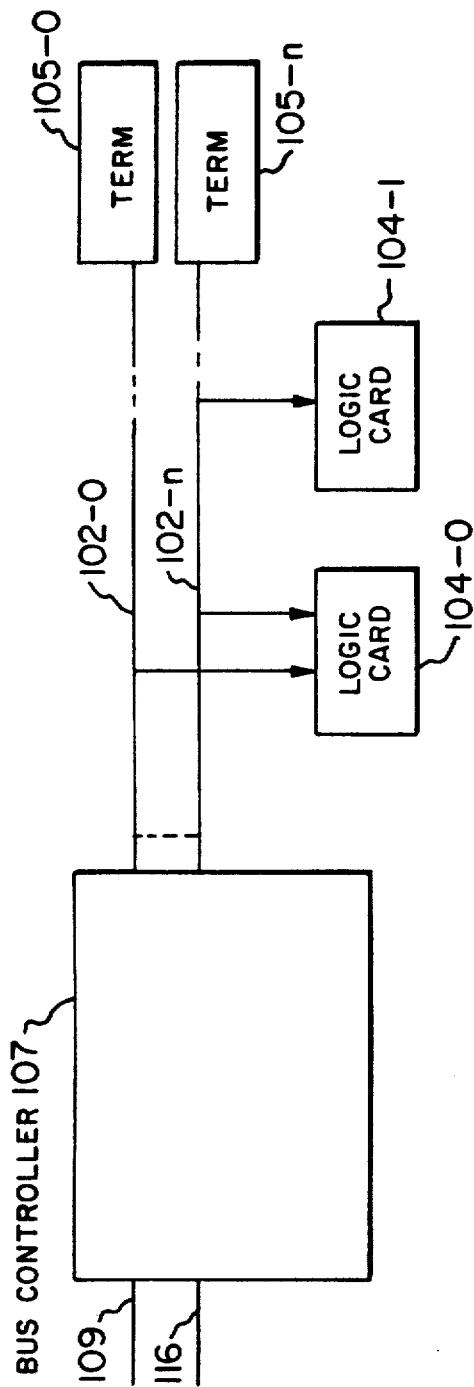
FIG. 3 discloses a system configuration wherein an additional logic card is added to a data bus segment.

FIG. 3 portrays the system state in which a new card 104-1 has been added to data bus 102-n and termination 105-n has been reconnected to data bus 102-n. Once these changes are completed, operating system 101 transmits a command to decoder 113 to cause it to once again apply an enable signal to its output conductor 114-n. This enables bus driver 111-n so that it can apply to data bus 102-n the data signals it receives on its input from source bus 109.

Figure 4:
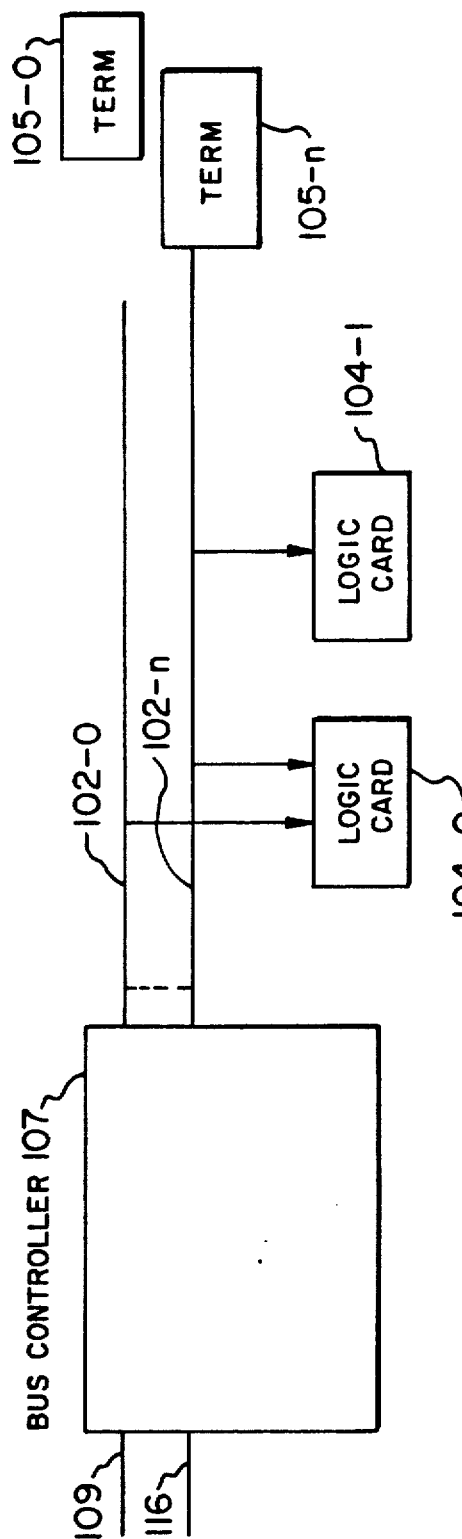
FIG. 4 discloses a system configuration wherein a logic card is connected to two different data bus segments.

FIG. 4 shows the system state in which driver 111-0 of data bus 102-0 is temporarily disabled by an inhibit signal on path 114-0. During this period of disablement, termination 105-0 is temporarily disconnected from data bus 102-0 preparatory to connecting data bus 102-0 to the newly added card 104-1.

Figure 5:
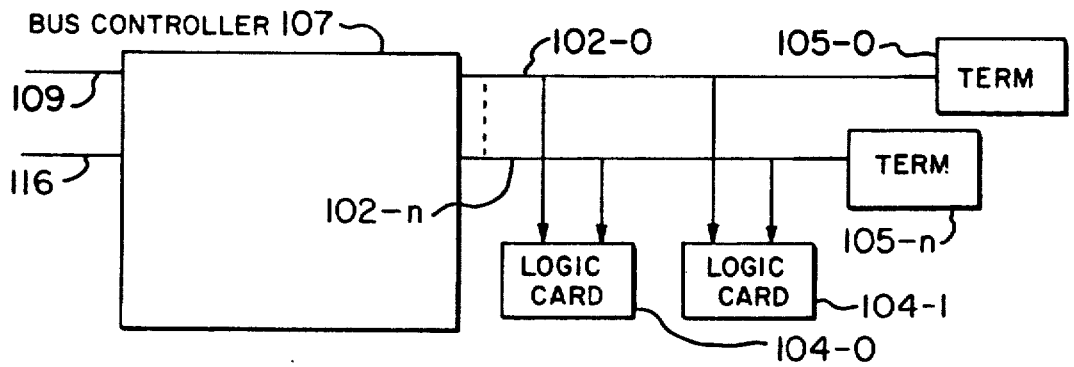
FIG. 5 discloses a system configuration wherein an added logic card is connected to two bus segments.

FIG. 5 shows the system state in which data bus 102-0 is connected to the newly added logic card 104-1 and termination 105-0. During the time that data bus 102-0 is disabled, the system functions of all cards connected to data bus 102-n may continue to be performed in the normal manner since data bus 102-n and the logic cards 104 connected thereto remain fully operational during the period of time that data bus 102-0 is inhibited.

DESCRIPTION OF FIGS. 6 AND 7

Figure 6:
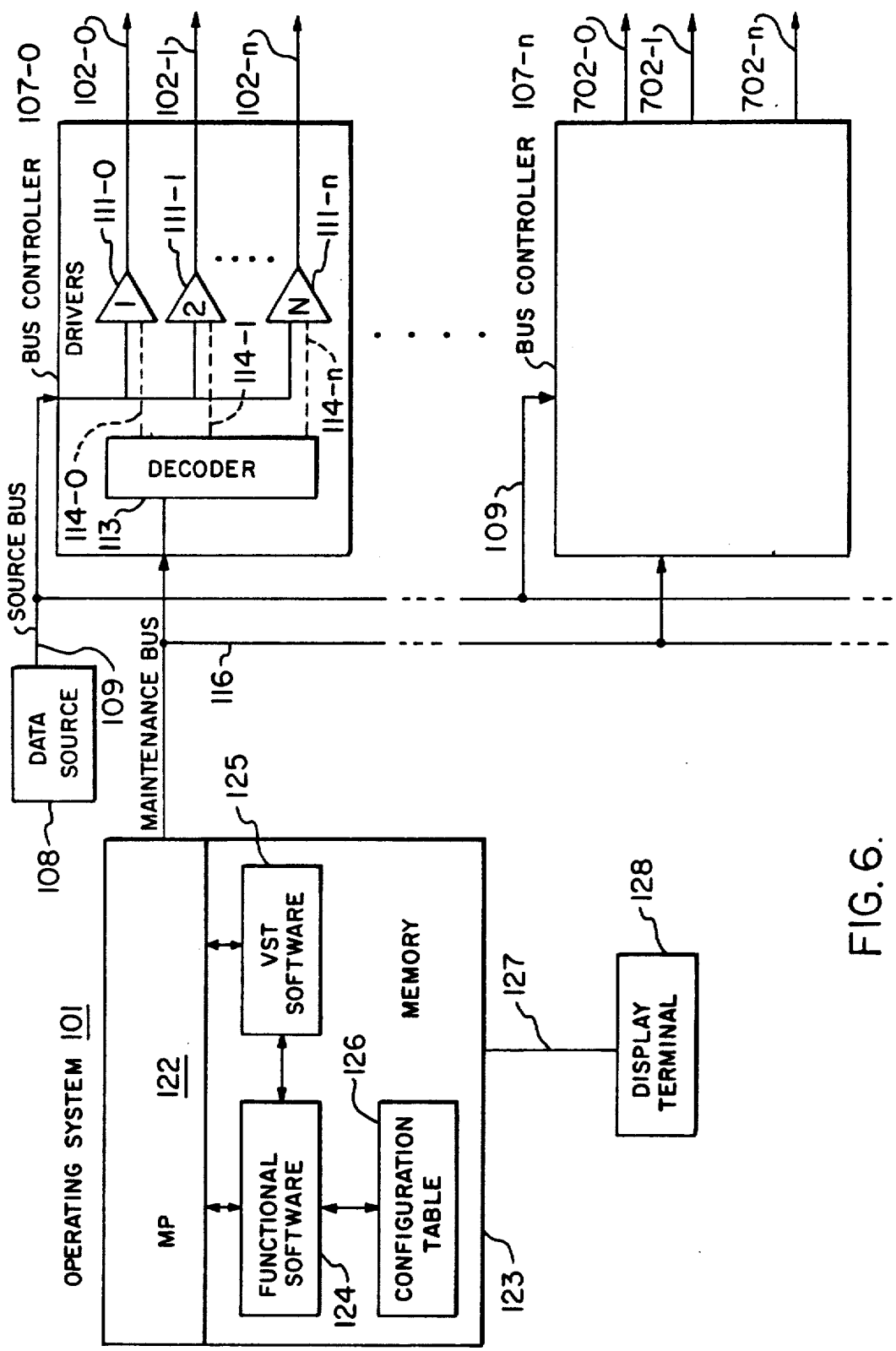

FIGS. 6 and 7, when FIG. 6 is placed to the left of FIG. 7, show further details of the system of FIGS. 1 through 5. FIGS. 6 and 7 show data source 108 connected via source bus 109 to a plurality of bus controllers 107-0 through 107-n each of which is similar to bus controller 107 of FIG. 1. Each bus controller 107 of FIGS. 6 and 7 is connected by its bus drivers 111 to a plurality of data buses 102-0 through 102-n or 702-0 through 702-n. The bus system 102 or 702 connected to each bus controller 107 serves a plurality of logic cards, such as logic cards 104-0 through 104-n, each of which is connected to two different data buses 102. Each data bus is also connected to a termination such as 105 or 705 to prevent the generation of standing waves as priorly described. The drivers of bus controller 107-0 are designated 111-0 through 111-n to correspond to the designation of the data buses 102-0 through 102-n to which they are connected. Decoder 113 is connected via its output conductors 114-0 through 114-n to drivers 111-0 through 111-n to control the enabled/inhibited state of the drivers. During the enabled state of the drivers, the data signals from data source 108 are extended over source bus 109 and through the enabled drivers 111 to the data buses 102 and, in turn, to the logic cards 104 to which the data buses are connected. Decoder 113 of bus controller 107-0 is connected via maintenance bus 116 with operating system 101. Maintenance bus 116 transmits control signals from operating system 101 to decoder 113 to control the inhibited/enabled state of the bus drivers 111 to which the decoder output conductors 114 are connected.

Operating system 101 comprises a microprocessor 122 and a memory 123. Memory 123 contains all of the software and program instructions required by microprocessor 122 to control the operation of system of FIGS. 6 and 7. Memory 123 includes VST software 125, functional software 124, and configuration table 126. Operating system 101 is connected via path 127 with user operated display terminal 128 which permits a user to generate control signals used by system 101 to control the maintenance functions associated with the present invention. Display terminal 128 also can receive system responses for display to a terminal user.

VST software 122 comprises the diagnostic software used in accordance with the invention. Functional software 124 comprises the software that cooperates with VST software 122 to perform system maintenance functions. Configuration table 126 contains information associating each of the logic cards, such as 104, with the data bus, such as 102, to which the logic card is connected. This is described in further detail.

On FIGS. 6 and 7, if a maintenance person wishes to remove logic card 104-0 from data buses 102-0 and 102-n, these two data buses must be first temporarily disabled before the logic card is removed to prevent the generation of standing waves that could destroy drivers 111-0 and 111-n. This disabling functions is performed by operating system 101 which transmits a command over maintenance bus 116 to decoder 113 to cause the decoder to apply inhibit potentials to its output conductors 114-0 and 114-n extending to drivers 111-0 and 111-n, respectively. These inhibit signals render drivers 111-0 and 111-n nonconductive to data signals on source bus 109. This prevents the application of data signals to data buses 102-0 and 102-n. The logic card 104-0 may then be removed and replaced with a new card. Following this, the user generates a command at terminal 128 indicating that logic card 104-0 has been replaced and that the system may now be restored to full operation. This is done by system 101 as it generates a command which is applied over maintenance bus 116 to decoder 113 to cause the decoder to enable drivers 111-0 and 111-n via conductors 114-0 and 114-n.

The system of FIGS. 6 and 7 comprises a plurality of additional bus controllers 107-1 through 107-n whose details (not shown) are identical to controller 107-0. Each of these bus controllers is connected to its own data bus system in the same manner as bus controller 107-0. System 101 may also transmit commands over maintenance bus 116 selectively to any decoder 113 of any bus controller 107 to control the active/inhibited state of each data bus in the entire system.

DESCRIPTION OF FIG. 8

Figure 8:
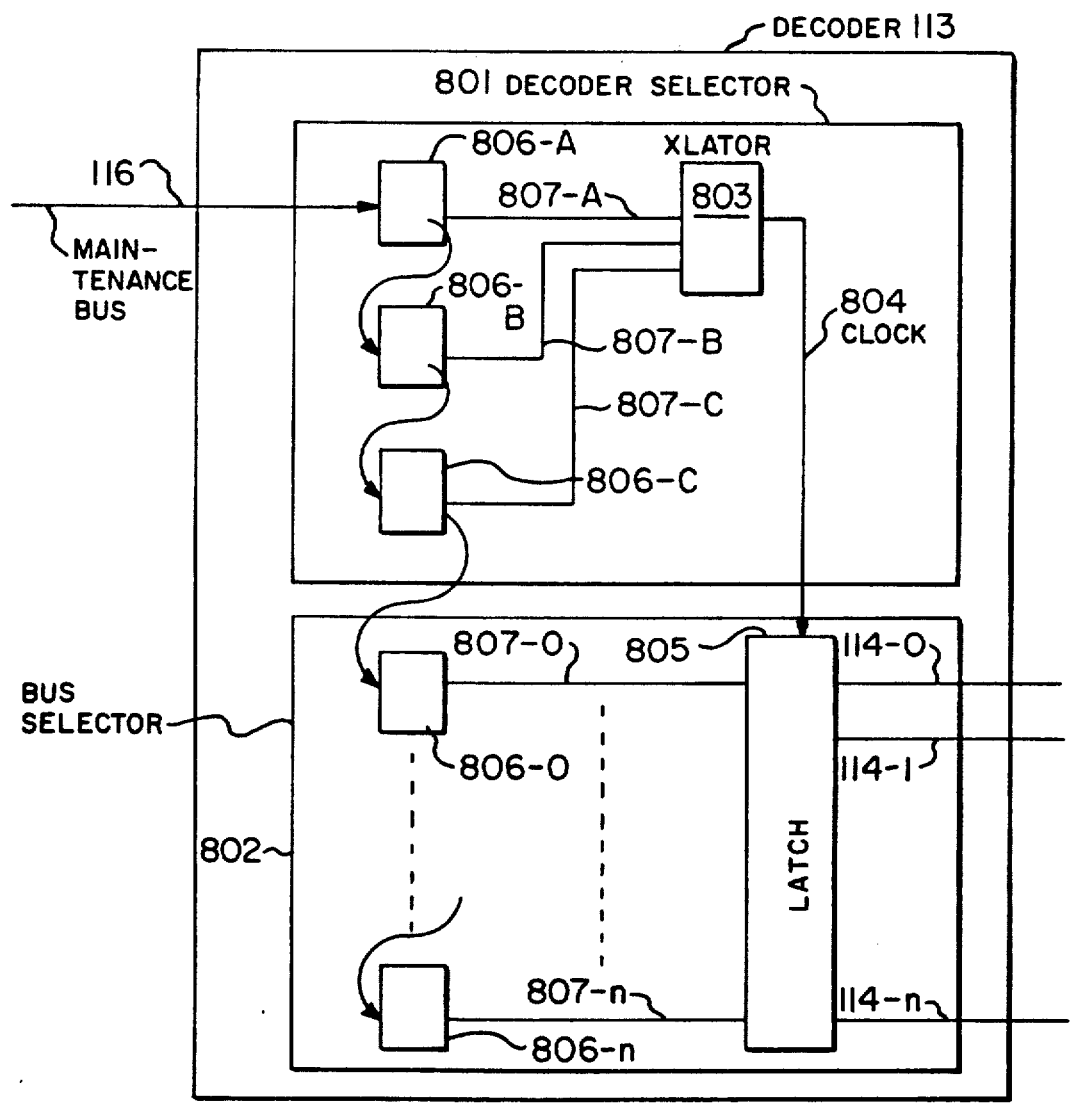
FIG. 8 discloses further details of the decoder 113 of FIG. 1.

FIG. 8 discloses further details of decoder 113. The decoder receives commands from maintenance bus 116 instructing it to either selectively enable or disable a specified one or more of the drivers 111 to which decoder 113 is connected via its output conductors 114. Decoder 113 responds to the receipt of each command and performs the enabling or inhibiting function specified by the command.

Decoder 113 comprises decoder selector 801 and a bus selector 802. Decoder selector 801 contains flip-flops 806-A, 806-B and 806-C. Bus selector 802 contains flip-flops 806-0 through 806-n. In transmitting a maintenance command to decoder 113, system 101 applies a serial word over maintenance bus 116 with the serial word having a plurality of bits equal in number to the three flip-flops 806-A, 806-B and 806-C plus the flip-flops 806-0 through 806-n. In each serially received command, the last three received bits arc stored in the flip-flops of decoder selector 801 while the remainder of the bits are stored in the flip-flops of bus selector 802. Maintenance bus 116 is connected in parallel to the decoder 113 in each bus controller 107. In order that a maintenance command may be addressed to only one decoder 113 exclusive of the remaining decoders 113, the decoder selector 801 in each decoder 113 is arranged to respond to a unique three-bit bit pattern. On FIG. 8, when translator 803 receives the three-bit signal to which it is to respond from flip-flops 806-A, 806-B, and 806-C, it generates an output clock signal on path 804 which is extended to latch 805 of bus selector 802. At this time, the state of each of flip-flops 806-0 through 806-n is applied over conductors 807-0 through 807-n to enter these signals into latch 805. The output of each section of latch 805 is connected to its associated output conductor 114 extending to the drivers 111 of the bus controller 107 of which the decoder 113 is a part.

Let it be assumed that a binary 1 comprises an enable signal for a driver 111 and that a binary 0 comprises an inhibit signal. In this case, all drivers 111 may be enabled for normal system operation by the receipt of a serial command that enters a binary 1 in all of flip-flops 806-0 through 806-n. These binary 1s are extended over the associated conductors 807 to each section of latch 805 which, in turn, applies a binary 1 to all of output conductors 114-0 through 114-n. This enables all drivers 111 of bus controller 107. In order to inhibit one or more of the bus drivers 111, the system controller 101 transmits a command over maintenance bus 116 with binary 0s in the bit positions of flip-flops 806-0 through 806-n associated with the drivers 111 that are to be inhibited. Thus, if drivers 111-0 and 111-n are to be inhibited, the received maintenance command has a binary 0 in its positions associated with flip-flop 806-0 and 806-n. It has a binary 1 in all of its other bit positions. As priorly mentioned, the bit positions associated with flip-flops 806-A, 806-B and 806-C are used to specify the particular decoder 113 that is to respond to the maintenance command exclusive of all other decoders 113. The output of these three flip-flops are extended over paths 807-A, 807-B and 807-C to the input of decoder 803 which, if the three-bit code applied to its input matches that to which the decoder is programmed to respond, generates an output signal on path 804 which is extended as a clock signal to latch 805 to clock in the bit pattern applied to it via its conductors 807.

DESCRIPTION OF FIG. 9

Figure 9:
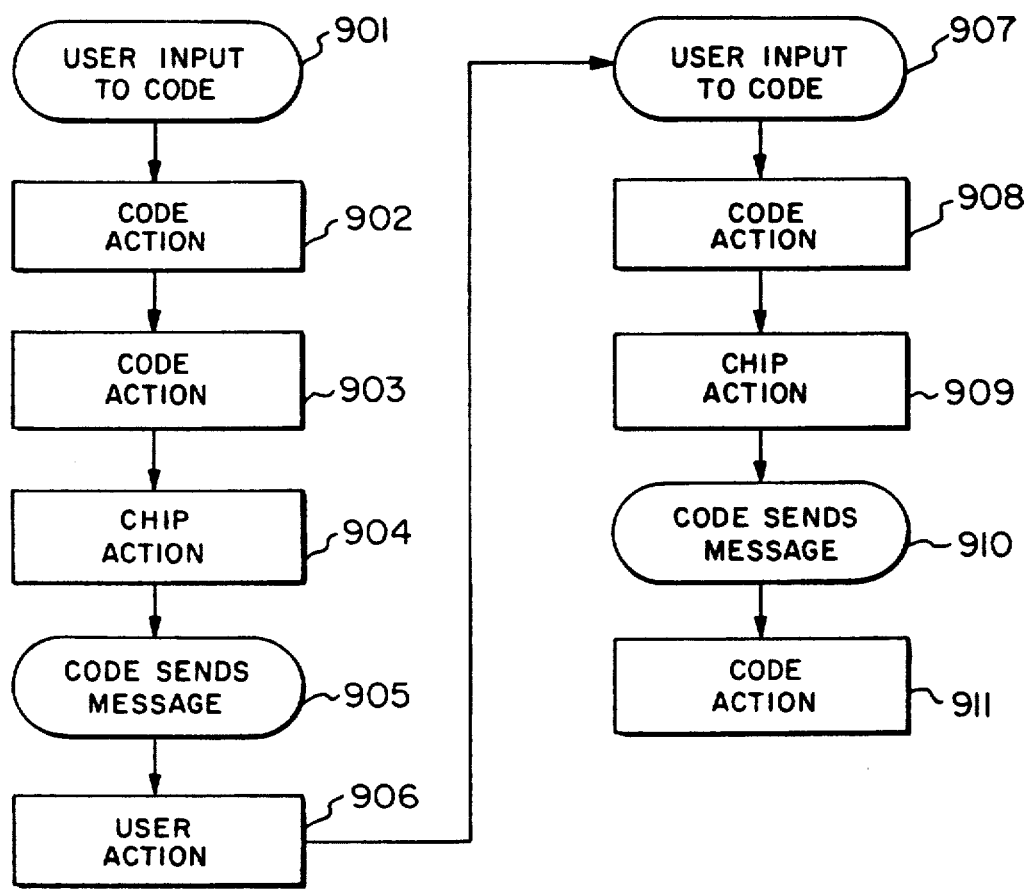
FIG. 9 discloses the operational system steps associated with the inhibiting of a selected bus segment and the subsequent restoration to operation of the bus segment.

FIG. 9 discloses the operational steps assumed by the system in performing a maintenance operation in which a data bus 102 is controllably switched from an enabled operational state to an inhibited state for the removal/replacement of a logic card 104 connected to the data bus. Following this, the inhibited data bus 102 is switched from an inhibited state back to an enabled state.

The process begins in element 901 in which a user at terminal 128 generates a command which is transmitted over path 127 to operating system 101. This command is applied by system 101 to VST maintenance software 125. The command instructs the software that a user at terminal 128 wishes to inhibit the data bus 102 connected to the logic card 104 specified by the user generated command. The identity of the card 104 is included in the information generated by terminal 128 and transmitted to VST software 125. In element 902, VST software 125 transmits a signal via functional software 124 to configuration table 126 to ascertain the identity of the data bus 102 to which the specified logic card 104 is connected. Let it be assumed that the logic card identified by the user is logic card 104-0 shown on FIGS. 6 and 7 which is connected to data buses 102-0 and 102-n of bus controller 107-0 (FIGS. 6 and 7). This information is made available to VST software 125 by the configuration table software 126 which indicates that logic card 104-0 is connected to data buses 102-0 and 102-n and that these buses are a part of the bus system connected to bus controller 107-0.

Having received this information, VST software 122 now cooperates with microprocessor 122 and functional software 124 in element 903 to cause a maintenance command to be transmitted over maintenance bus 116 to decoder 113 of controller 107-0 instructing the decoder to inhibit drivers 111-0 and 111-n.

The process now proceeds to element 904 in which decoder 113 decodes this received command and disables drivers 111-0 and 111-n so that the data signals applied to these drivers by source bus 109 cannot appear on data buses 102-0 and 102-n.

In element 905 the VST element 125 causes a command to be generated which is sent to terminal 128 advising the user that it is now safe to remove the logic cards that are connected to data buses 102-0 and 102-n. In element 906, the user removes logic card 104-0 and replaces it with a new card. In element 907 the user generates a command at terminal 128 which is transmitted to system 101 to advise VST software 125 that the maintenance function has now been completed. In element 908, VST software 125 causes a command to be generated which is transmitted over maintenance bus 116 to decoder 113 to cause it to enable drivers 111-0 and 111-n via its output conductors 114-0 and 114-n. In element 909, decoder 113 responds to the received command and, via its output conductors 114-0 and 114-n, once again enables drivers 111-0 and 111-n to restore data buses 102-0 and 102-n to service. In element 910, VST software advises the users that the data buses have been enabled. In element 911, the functional code 123 updates the system configuration information.

The system commands generated at terminal 128 by a user in the performance of maintenance functions may differ depending on the maintenance function to be performed. For example, it has just been described how the commands are generated to permit a specific card to be removed after the data buses to which the card is connected are inhibited. Other system maintenance commands may be generated when it's desired to either add additional cards to a data bus or to remove some currently connected cards from the data bus. In all instances, the commands generated by the user at terminal 128 specify to VST software 125 exactly what action is to be taken in connection with the maintenance function. VST software 125 causes the required data buses 104 to be inhibited in response to each command when the performance of a system maintenance operation requires either an increase or a decrease in the number of logic cards connected to a system data bus 102.

It is expressly understood that the claimed invention is not to be limited to the description of the preferred embodiment but encompasses other modifications and alterations within the scope and spirit of the inventive concept.

We claim:

1. In a system for extending signals from a signal source to signal receiving circuits connected to a data bus, said system comprising:
   a plurality of data bus drivers each having an input connected to said signal source for receiving signals from said source,
   a plurality of data busses each of which is connected to an output of a different one of said drivers,
   each of said drivers being normally effective for extending said signals received by said input of said each driver to said output of said each driver and, in turn, to the one of said data busses to which said output of said each driver is connected,
   each data bus being effective for applying said signals received by said each data bus to a signal receiving circuit connected to said each data bus, and
   means for controllably disabling a selected one of said drivers to prevent said signals from said source from being extended through said selected disabled driver to the data bus connected to an output of said selected disabled driver.

2. In a system in which signals are normally transmitted from a signal source via a data bus system to signal receiving circuits, said system comprising:
   a plurality of bus controllers,
   a plurality of data bus drivers in each controller with an input of each driver being connected to said signal source for receiving signals from said source,
   an output on each driver,
   a plurality of data busses associated with each controller with each bus being connected to an output of a different one of said drivers,
   each of said data busses being connected to at least one of said signal receiving circuits,
   means normally effective for extending said received signals from said source through each driver to the data bus connected to the output of said each driver for extension to the signal receiving circuit connected to said connected data bus, and
   means for controllably disabling a selected one of said drivers to prevent signals from said source from being extended through said selected disabled driver to the data bus connected to the output of said selected disabled driver.

3. The system of claim 2 wherein said means for controllably disabling comprises:

a control input on each of said drivers for controlling the disabled state of said each driver, a decoder in each bus controller, a plurality of outputs on each of said decoders with each output being connected to said control input of a different one of said drivers of the controller containing said each decoder, an input on each of said decoders, each of said decoders being controllably responsive to the receipt of a disable control signal on its input for applying a disable signal from one of its outputs to said control input of a selected one of said connected drivers to disable said selected one driver so that signals from said source cannot be extended through said selected one driver.

4. The system of claim 3 wherein said means for controllably disabling further comprises:

an operating system, means in said operating system for generating disable control signals specifying the disabling of a specified one of said drivers, and a maintenance bus for extending said disable control signals generated by said operating system to said input of said decoders to control the disabling of said driver specified by each of said disable control signals.

5. The system of claim 4 in combination with a user operated terminal connected to said operating system, and means in said user operated terminal for enabling a user at said terminal to control the operation of said operating system so that a selected one of said drivers may be placed in a disabled state by the extension of said disable control signals from said operating system to said input of said decoders.

6. The system of claim 5 wherein said each decoder comprises:

means for applying a serial multibit signal received from said maintenance bus to a plurality of serially connected flip flops in said each decoder, means for storing m bits of said applied signal in m of said flip flops, said m bits representing a code specifying one of said controllers, means for storing n bits of said applied signal in n of said flip flops of said each decoder, means for applying outputs of said m flip flops to inputs of a selector translator of said decoder, means for applying outputs of said n flip flops to n different inputs of a latch of said decoder, means for applying an output of said selector translator to a gating input of said latch whereby said latch stores said n outputs of said n flip flops only when said gating input is enabled when said m bits specify the code of said controller containing said translator, and means for applying n separate output signals from said latch to n conductors extending to said control input of each of said drivers of said controller containing said translator.

7. A method of operating a system for extending signals from a signal source to signal receiving circuits connected to a data bus, said method comprising the steps of:

applying signals from said signal source to an input on each of a plurality of data bus drivers, normally extending said signals applied to said input of each driver through said each driver to an output of said each driver, applying said signals on said output of each of said drivers to a plurality of data busses each of which is connected to an output of a different one of said drivers, extending said signals applied to each data bus to a signal receiving circuit connected to said each data bus, and controllably disabling a selected on a said drivers to prevent signals from said source from being extended through said selected disabled driver to the data bus connected to the output of said selected disabled driver.

8. A method of operating a system in which signals are normally transmitted from a signal source via data busses to signal receiving circuits connected to said data busses, said method comprising the steps of:

applying signals from said signal source to an input of a plurality of data bus drivers in each of a plurality of bus controllers, normally extending said signals applied to an input of each of said drivers to an output of said each driver, applying said signals on said output of each of said drivers to one of a plurality of data busses each of which is connected to an output of a different one of said drivers, extending said signals applied to each data bus to the ones of said signal receiving circuits to which said each data bus is connected, and controllably disabling a selected one of said drivers to prevent said signals from being extending from said source through said selected disabled driver to the data bus connected to the output of said selected disabled driver.

9. The method of claim 8 wherein said step of controllably disabling a selected one of said drivers comprises the step of:

applying a disable control signal to an input on a decoder in each of said controllers, each of said decoders having a plurality of outputs with each output being connected to a control input of a different one of said drivers, and in response to said application of said disable control signal, applying a disable signal from an output of one of said decoders to the control input of a selected one of said connected drivers to disable said selected one driver so that signals from said source cannot be extended through said selected one driver.

10. The method of claim 9 wherein said steps of controllably disabling further comprises the steps of:

controlling an operating system to generate disable control signals specifying the disabling of a selected one of said drivers, and extending said disable control signals generated by said operating system via a maintenance bus to said one decoder to control the disabling of said selected one driver.

11. The method of claim 10 in combination with the step of:

operating a user terminal connected to said operating system for enabling a user at said terminal to control the operation of said operating system so that a specified one of said drivers may be disabled by the extension of said disable control signals from said operating system to said input of said one decoder.

12. The method of claim 11 wherein the step of operating each said decoder of a controller comprises the steps of:

applying a serial multibit signal from said maintenance bus to a plurality of serially connected flip flops in said each decoder, storing m bits of said signal in m of said flip flops, said m bits representing a code specifying one of said controllers, storing n bits of said signal in n of said flip flops, applying signal outputs of said m flip flops to inputs of a selector translator of said decoder, applying signal outputs of said n flip flops to n inputs of a latch of said decoder, operating said translator to generate an enable signal on its output only when said m bits specify the code of the one of said controllers containing said translator, applying an output of said translator to a gating input of said latch whereby said latch stores said n signal outputs of said n flip flops only when said gating input is enabled by said translator, and applying separate output signals from said latch to conductors extending to said control input of each of said drivers of said controller containing said translator to control the inhibited/enabled state of a selected one of said drivers.

* * * * *